(12) United States Patent
Sutton, Jr. et al.

(10) Patent No.: US 7,707,261 B1
(45) Date of Patent: Apr. 27, 2010

(54) IDENTIFICATION AND FILTRATION OF DIGITAL COMMUNICATIONS

(75) Inventors: Lorin R. Sutton, Jr., Woodbridge, VA (US); Roy Ben-Yoseph, Ashburn, VA (US)

(73) Assignee: AOL Inc., Dulles, VA (US)

( * ) Notice: Subject to any disclaimer, the term of this patent is extended or adjusted under 35 U.S.C. 154(b) by 0 days.

(21) Appl. No.: 12/176,917

(22) Filed: Jul. 21, 2008

Related U.S. Application Data

(60) Division of application No. 11/750,774, filed on May 18, 2007, now Pat. No. 7,406,506, which is a continuation of application No. 10/306,880, filed on Nov. 27, 2002, now Pat. No. 7,222,157.

(60) Provisional application No. 60/395,609, filed on Jul. 15, 2002.

(51) Int. Cl.
G06F 15/16 (2006.01)

(52) U.S. Cl. .................. 709/206; 709/207; 709/203; 709/224

(58) Field of Classification Search ........... 709/206, 709/207, 203, 223–224, 250
See application file for complete search history.

(56) References Cited

U.S. PATENT DOCUMENTS

| | | | | |
|---|---|---|---|---|
| 5,999,932 A * | 12/1999 | Paul | ........................ | 709/206 |
| 6,161,130 A * | 12/2000 | Horvitz et al. | .............. | 709/206 |
| 6,167,434 A | 12/2000 | Pang | | |
| 6,266,692 B1 | 7/2001 | Greenstein | | |
| 6,321,267 B1 | 11/2001 | Donaldson | | |
| 6,393,465 B2 | 5/2002 | Leeds | | |
| 6,405,319 B1 | 6/2002 | Arnold et al. | | |
| 6,421,709 B1 | 7/2002 | McCormick et al. | | |
| 6,453,327 B1 * | 9/2002 | Nielsen | ....................... | 709/206 |
| 6,615,242 B1 * | 9/2003 | Riemers | ..................... | 709/206 |
| 6,654,787 B1 * | 11/2003 | Aronson et al. | ............. | 709/206 |
| 6,748,422 B2 | 6/2004 | Morin et al. | | |
| 6,779,021 B1 | 8/2004 | Bates et al. | | |
| 6,829,631 B1 | 12/2004 | Forman et al. | | |
| 6,868,498 B1 | 3/2005 | Katsikas | | |
| 6,957,259 B1 | 10/2005 | Malik | | |
| 7,058,684 B1 * | 6/2006 | Ueda | ......................... | 709/206 |
| 7,072,942 B1 | 7/2006 | Maller | | |
| 7,117,358 B2 | 10/2006 | Bandini et al. | | |
| 7,149,778 B1 | 12/2006 | Patel et al. | | |
| 7,516,182 B2 * | 4/2009 | Goldman | ..................... | 709/206 |
| 2002/0129111 A1 | 9/2002 | Cooper | | |
| 2003/0009698 A1 | 1/2003 | Lindeman et al. | | |

OTHER PUBLICATIONS http://razor.sourceforge.net/, Vipul's Razor, Jun. 24, 2002, 22 pages.

(Continued)

*Primary Examiner*—Philip B Tran
(74) *Attorney, Agent, or Firm*—Fish & Richardson P.C.

(57) ABSTRACT

An apparatus for classifying digital communications includes an interface module, an identification module, and a notification module. The interface module enables a recipient to perceive information relating to one or more digital communications received by the recipient. The identification module enables a first interface element capable of enabling the recipient to classify the digital communications among at least one category. The notification module notifies a network server of a classification received from the recipient using the first interface element.

20 Claims, 10 Drawing Sheets

OTHER PUBLICATIONS http://msnbc-cnet.com.com/2100-1023-937300.html?tag=rn, "Start-up wants your help to fight spam," CNET News.com Review-700XL, Jun. 19, 2002, 3 pages.

http://msnbc-cnet.com.com/2100-1023-829399.html?tag=rn, "Net surfers set out to squelch spam," CNET News.com, Feb. 5, 2002, 4 pages.

http://msnbc-cnet.com.com/2104-10230938103.html, "The Big Picture," CNET News.com Review—700XL, Jun. 24, 2002, 2 pages.

http://msnbc-cnet.com.com/2100-1023-834044.html?tag=bp1st, "FTC prepares to bust spammers," Feb. 11, 2002, 2 pages.

http://msnbc-cnet.com.com/2100-1023-938103.html?type=pt&part=msnbc&tag=alert&form=f, "Anti-spam service battles bugs," Jun. 20, 2002, 3 pages.

http://www.cloudmark.com/, home products support company, "cloudmark," Jun. 24, 2002, 17 pages.

\* cited by examiner

FIG. 10

IDENTIFICATION AND FILTRATION OF DIGITAL COMMUNICATIONS

CROSS REFERENCE TO RELATED APPLICATION

This application is a divisional of U.S. patent application Ser. No. 11/750,774, filed May 18, 2007, titled IDENTIFICATION AND FILTRATION OF DIGITAL COMMUNICATIONS, now U.S. Pat. No. 7,406,506, which is a continuation of U.S. patent application Ser. No. 10/306,880, filed Nov. 27, 2002, titled IDENTIFICATION AND FILTRATION OF DIGITAL COMMUNICATIONS, now U.S. Pat. No. 7,222,157, which claims priority from U.S. Provisional Application No. 60/395,609, filed Jul. 15, 2002, and titled SPAM IDENTIFICATION THROUGH RECIPIENT VOTING. The prior applications are incorporated by reference herein in their entirety.

TECHNICAL FIELD

This disclosure relates to detection and filtration of digital communications on an electronic network.

BACKGROUND

Network systems enable communication of messages among computer systems. For example, an electronic mail system (or a compatible system) enables the communication of e-mail messages between computers attached to a network. Some messages transferred over the system may not be desired by their recipient. Such messages typically are referred to as spam. In addition to annoying their recipients, spam messages cause a needless waste of resources.

SUMMARY

In one general aspect, an apparatus for classifying digital communications includes an interface module, an identification module, and a notification module. The interface module enables a recipient to perceive information relating to one or more digital communications received by the recipient. The identification module provides a first interface element capable of enabling the recipient to classify the digital communications among at least one category. The notification module notifies a network server of a classification received from the recipient using the first interface element.

Implementations may include one or more of the following features. For example, the digital communications may be e-mails or instant messages. The first interface element may be capable of enabling the recipient to classify the digital communications as unsolicited digital communications or as spam. The identification module may comprise a client software module or a host-based software module perceivable through a browser interface.

The apparatus may further include a second interface element module that provides a second interface element that permits the recipient to enter information pertaining to the digital communication. The second interface element may be enabled in response to selection of the first interface element by the recipient. The second interface element may enable the recipient to enter text relating to the digital communication, select one or more pre-determined responses, and/or enter voice data relating to the digital communication.

In another general aspect, classifying digital communications includes enabling a recipient to perceive information relating to one or more digital communications received by the recipient. A first interface element enables the recipient to classify the digital communications among at least one category. The recipient signals classification of the digital communications by selecting the first interface element. A network server is notified of the selection of the first interface element by the recipient.

Implementations may include one or more of the following features. For example, the digital communications may be e-mails or instant messages. The first interface element may enable the recipient to classify the digital communications as unsolicited digital communications or as spam. A second interface element may enable the user to indicate information pertaining to the digital communication and may be enabled upon selection of the first interface element.

In another general aspect, a user interface includes a first interface element and a second interface element. The first interface element enables a recipient to perceive information relating to one or more digital communications received by the recipient. The second interface element enables the recipient to classify the digital communications among at least one category and to notify a network server of the classification.

Implementations may include one or more of the following features. For example, a third interface element may allow a recipient to enter information pertaining to the digital communications. The third interface element may be enabled in response to the recipient selecting the second interface element.

In another general aspect, handling digital communications includes receiving complaint communications from one or more receiving systems. The complaint communications are generated by one or more receiving systems in response to a first digital communication received by the one or more receiving systems. Counters associated with the first digital communication or with the sender of the first digital communication are incremented or decremented based on the received complaint communications. Digital communications similar to the first digital communication or generated by the sender of the first digital communication are handled in different ways based on the counters.

Implementations may include one or more of the following features. For example, the digital communications may be e-mails. The digital communications similar to the first digital communication may be e-mails that include portions of text also included in the first digital communication.

One, more than one, or all future digital communications from the sender to one or more of the receiving systems may be blocked. Alternatively, only those future digital communications from the sender that share characteristics with the first digital communication may be blocked. The future digital communications and the first digital communication may be e-mails, and the shared characteristics may include a portion of text.

One or more future digital communications from the sender may be categorized. The future digital communications may be categorized as suspect or held for further review.

An apparatus for handling communications includes a receiving module, one or more counters associated with a first digital communication or with a sender of the first digital communication, and a digital communication processing module. The receiving module receives complaint communications from one or more receiving systems generated in response to the first digital communication sent by the sender to the one or more receiving systems. The counters are incremented or decremented based on the complaint communications received. Based on the counters, the digital communication processing module modifies the way in which digital communications similar to the first digital communication or generated by the sender of the first digital communication are handled.

The details of one or more implementations are set forth in the accompanying drawings and the description below. Other features will be apparent from the description and drawings, and from the claims.

DESCRIPTION OF DRAWINGS

FIG. 10 is an exemplary user interface for generating a complaint communication.

Figure 1:
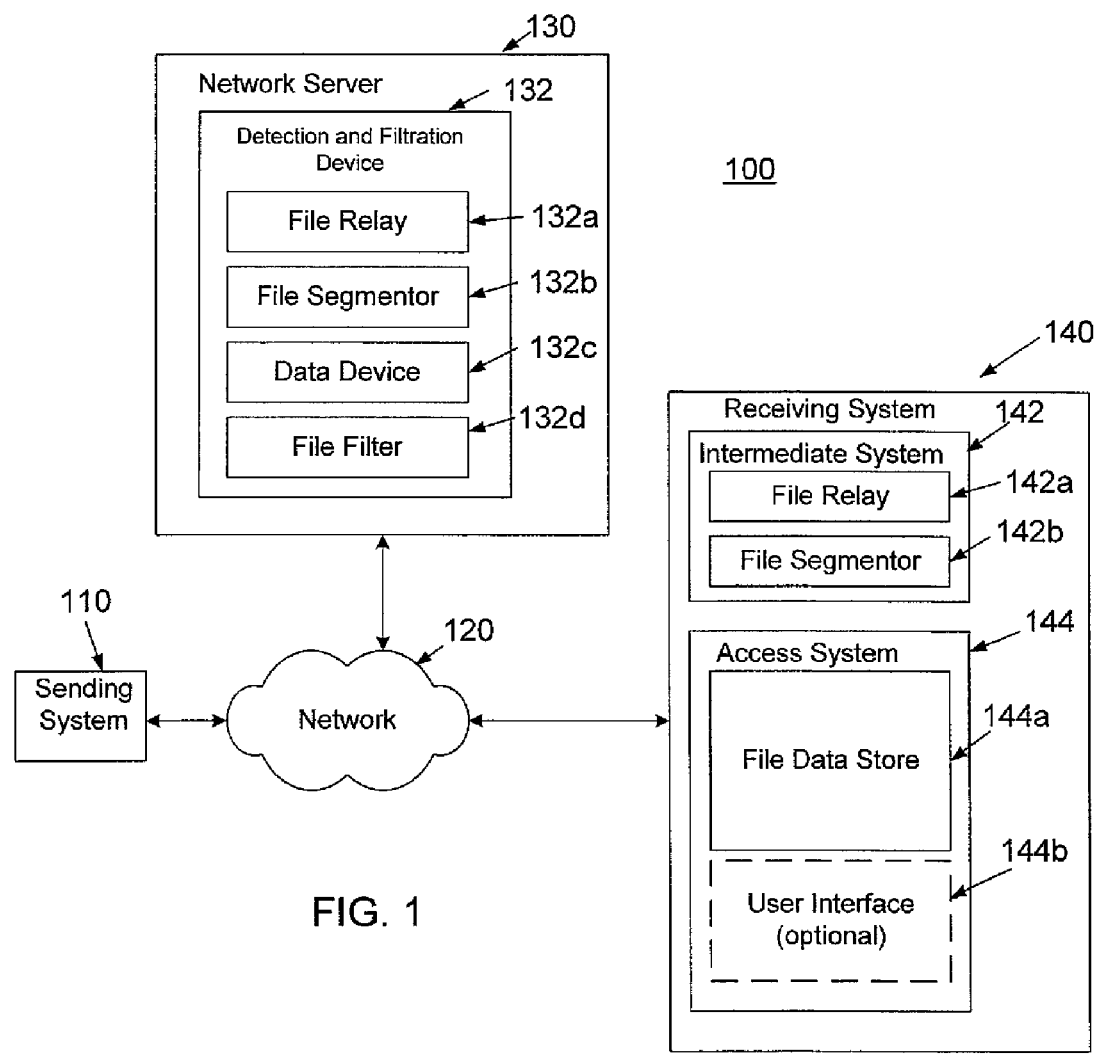
FIG. 1 is a block diagram illustrating an exemplary network system capable of identifying and filtering unsolicited communications.

Like reference symbols in the various drawings indicate like elements. For brevity, elements in the figures are represented as monolithic entities. However, implementations of these elements may include numerous interconnected computers and components that are designed to perform a set of specified operations and/or that are dedicated to a particular geographic region. Furthermore, one or more of the elements illustrated by the figures may be operated jointly or independently by one or more organizations.

DETAILED DESCRIPTION

In a communications system that enables identification and filtration of unsolicited communications, a sending system sends an unsolicited communication to one or more recipient systems over a network through a detection and filtration device of a network server. The recipient system enables an entity to generate a complaint communication based on the received unsolicited communication. The complaint communication may be generated in response to mere actuation of a notify button or report button on the recipient user interface. The complaint communication, includes the cause for the complaint or a portion of the cause, is sent to the network server.

The network server segments the complaint communication into constituent parts and generates a digital signature for one or more of the portions of the complaint communication. The network server stores prior complaint communications and/or parts thereof as well as corresponding digital signatures. The network server compares one or more digital signatures of the received complaint communication and/or its parts with those stored in the data device. A counter associated with each matching digital signature, if any, is incremented. The digital signatures that do not match are stored along with their associated complaint communication or complaint parts.

The counters keep track of the number of duplicate complaints sent by recipient systems to the network server in response to a given communication or communication sender. The values indicated by the counters, therefore, correspond to the number of complaints or "votes" received from recipient systems in response to a given communication or communication sender.

When the network server receives a subsequent communication from a sending system, the network server segments the communication, computes a digital signature for all or part of the communication, and compares the computed digital signatures with those previously stored. The counters associated with the digital signatures are examined and filtering operations are performed based on the values indicated by the counters and the stored complaint communication or complaint parts. For example, if one or more of the counters indicate values above a threshold level, the detection and filtration device may perform one or more filtering operations including, but not limited to, blocking the communication from being sent to the recipient, marking the Internet Protocol (IP) address of the sender as suspect, terminating or suspending the sending privileges of the Internet Service Provider (ISP) account of the sender, refusing to allow further communications sent from the specified IP address, and holding the communication for further review.

In one specific implementation, the communication system is an e-mail system, the communications are e-mails, and the unsolicited communications are spam. In general, however, the systems, processes, and techniques described may be used to detect and filter any type of digital communication, whether unsolicited or not. In this general implementation, the complaint communication is referred to as a categorization communication.

Referring to FIG. 1, a network system 100 capable of identifying and filtering unsolicited communications includes a sending system 110 that sends communications to a receiving system 140 through a network 120 and a network server 130.

Each of the sending system 110 and the receiving system 140 may be implemented by, for example, a general-purpose computer capable of responding to and executing instructions in a defined manner, a personal computer, a special-purpose computer, a workstation, a server, a device, a component, or other equipment or some combination thereof capable of responding to and executing instructions. The sending system 110 may receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the sending system 110 or the receiving system 140.

The sending system 110 includes a communications interface (not shown) used to send communications in the form of digital files to the receiving system 140 through the network server 130, and the receiving system 140 includes a communications interface (not shown) used to receive such communications and digital files. The digital files may include electronic mail (e-mail), instant messages (IMs), or any file including audio data, video data, general binary data, or text data (e.g., encoded in American Standard Code for Information Interchange (ASCII) format).

The network 120 typically includes a series of portals interconnected through a coherent system. Examples of the network 120 include the Internet, the World Wide Web, Wide Area Networks (WANs), Local Area Networks (LANs), analog or digital wired and wireless telephone networks (e.g., a Public Switched Telephone Network (PSTN), an Integrated Services Digital Network (ISDN), or a Digital Subscriber Line (xDSL)), and a delivery mechanism for carrying data (e.g., radio, television, cable, or satellite). The network 120 may include multiple networks or subnetworks, each of which may include, for example, a wired or wireless data pathway.

The network server 130 enables direct or indirect communications between the sending system 110 and the receiving system 140. In the implementation illustrated by FIG. 1, the network server 130 includes a detection and filtration device 132 used to detect and filter unsolicited communications. The device 132 includes a file relay 132a, a file segmentor 132b, a data device 132c, and a file filter 132d.

The file relay 132a receives incoming digital files from the sending system 110. The file relay 132a may include one or more general purpose computing devices capable of communicating with the sending system 110 using a file transfer protocol or a general communications protocol with file receiving capabilities. The file relay 132a may be implemented to varying degrees in specialized hardware designed to receive digital files. The file relay 132a also may be implemented using one or more applications residing on a device that consolidates one or more file receiving functions. The file relay 132a communicates with the file segmentor 132b.

The file segmentor 132b receives digital files from the file relay 132a, and segments, separates, or divides the digital files into constituent parts or portions. The file segmentor 132b may segment a digital file in a variety of different ways. For example, the file segmentor 132b may segment file identification information from the remainder of a file. Alternatively, the file segmentor 132b may segment the contents of the files into portions based on the structure of the file as designated by, for example, flags, labels, or other indicators within the file that identify different structural sections of the file. The file segmentor 132b also may segment the digital file based on specific identified aspects such as, for example, text or data sequences in the file.

The file segmentor 132b associates the digital file and/or portions of the digital file with related or corresponding digital files and/or portions of digital files previously received by the detection and filtration device 132. The digital files and/or portions of digital files may be associated based on a common identifier and/or a common storage location. The common identifier may include a screen name, a user identification, or an IP address. The common storage location may include, for example, common location identifiers such as pointers, arrays, or records.

The data device 132c receives the digital file and/or digital file portions from the file segmentor 132b and stores the digital file and/or digital file portions in a data storage or central repository. The data device 132c also may include a software or a hardware program that enables the data device 132c to create a digital signature for the digital file or for one or more of the digital file portions.

A digital signature may be used for identification purposes as a unique profile or fingerprint of a digital file or digital file portion. The digital signature for a digital file or a digital file portion may be computed, for example, by applying a hashing technique to all or part of the digital file or digital file portion. The output of the hashing technique is referred to as a hash value. Typically, the hash value is substantially smaller than the requested digital file or digital file portion. The hash value is generated from an algorithm in such a way that it is extremely unlikely that different digital files or digital file portions will produce the same hash value. Examples of hashing techniques include, but are not limited to, the MD5 ("Message Digest 5") family of algorithms and/or the SHA ("Secure Hash Algorithm") family of algorithms. The digital signature includes the hash value and also may include various information related to the digital file or digital file portion. For example, the digital signature may include a file name and/or a memory storage size in addition to the hash value.

The data device 132c may use digital signatures to efficiently perform searches and comparisons of digital files or digital file portions received from the file segmentor 132b. The data device 132c may reduce the storage space required to store the received digital files or digital file portions by, for example, comparing the digital signatures of the received digital file or digital file portions with the digital signatures of other digital files or digital file portions previously stored by the data device 132c. If the received digital file or digital file portion duplicates a previously received and stored digital file or digital file portion, the data device 132c increments a counter associated with the digital file or digital file portion rather than storing another copy of the digital file or digital file portion. The counter enables the detection and filtration device 132 to track the number of times a duplicate digital file or digital file portion is received from the file segmentor 132b. In another implementation, the data device 132c may decrement a counter associated with the digital file or digital file portion. For example, the counter may be preset at a fixed positive value, and the data device 132c may decrement the counter each time a corresponding duplicate digital file or digital file portion is received from the file segmentor 132b. When the counter reaches zero, the counter is no longer decremented, and an operation may be launched (e.g., a complaint e-mail may be sent to a sender of the digital file).

The data device 132c may be implemented by one or more general purpose computers running an operating system and an application. For example, the data device 132c may be implemented as a group of servers running a general purpose operating system and several applications that search accessed or maintained digital signatures that correspond to stored digital files or digital file portions accessible to the detection and filtration device 132. The data device 132c also may be completely or partially implemented by a special purpose device running a reduced operating system. For example, the data device 132c may include hardware designed to support large arrays of signatures and to return results of a search of those signatures.

In some implementations, the data device 132c has regional awareness of some stored digital signatures for digital files or digital file portions received by one or several data devices 132c. In other implementations, the data device 132c has global awareness of all stored digital signatures. Some implementations of the data device 132c may offer global awareness of stored digital signatures residing in several systems and also may provide for a local awareness in individual systems in the event of a power outage or a system failure.

The digital signatures of stored digital files or digital file portions accessible to the detection and filtration device 132 may be stored as an array of values, an index, a dynamic list or in another way, and may be stored locally at the data device 132c, remotely in a single device, or distributed across several devices. The digital signatures may be sorted or organized for faster or more efficient comparisons.

The file filter 132d may perform one or more different actions depending on the outcome of the comparison of the digital signatures of the digital file and/or digital file portions performed by the data device 132c. The file filter 132d may, for example, perform one or more of the following actions: (1) deliver the received digital file to its intended recipient; (2) mark the IP address of the sender as suspect; (3) block the digital file from being sent to its intended recipient; (3) terminate or suspend the sending privileges of the ISP account of the sender; (4) refuse to allow further connections from the IP address of the sender; and (5) hold the digital file for further review. The file filter 132d may determine which action to perform based on the value of the counter or counters associated with the received digital file or digital file portion.

The receiving system 140 includes an intermediate system 142 and an access system 144. The intermediate system 142 receives digital files from one or more sending systems 110 through the network server 130 and distributes the received digital files to the access system 144. The intermediate system 142 includes a file relay 142a and a file segmentor 142b. The file relay 142a and file segmentor 142b are structured and arranged similarly to those located in the detection and filtration device 132.

The access system 144 enables an entity, such as a user, to access digital files or digital file portions that have been sent to or that otherwise are made accessible to the receiving system 140. The access system 144 includes a file data store 144a used to store digital files or portions of digital files received by the file segmentor 142b and an optional user interface 144b used when the entity accessing the digital files is a user.

Figure 2:
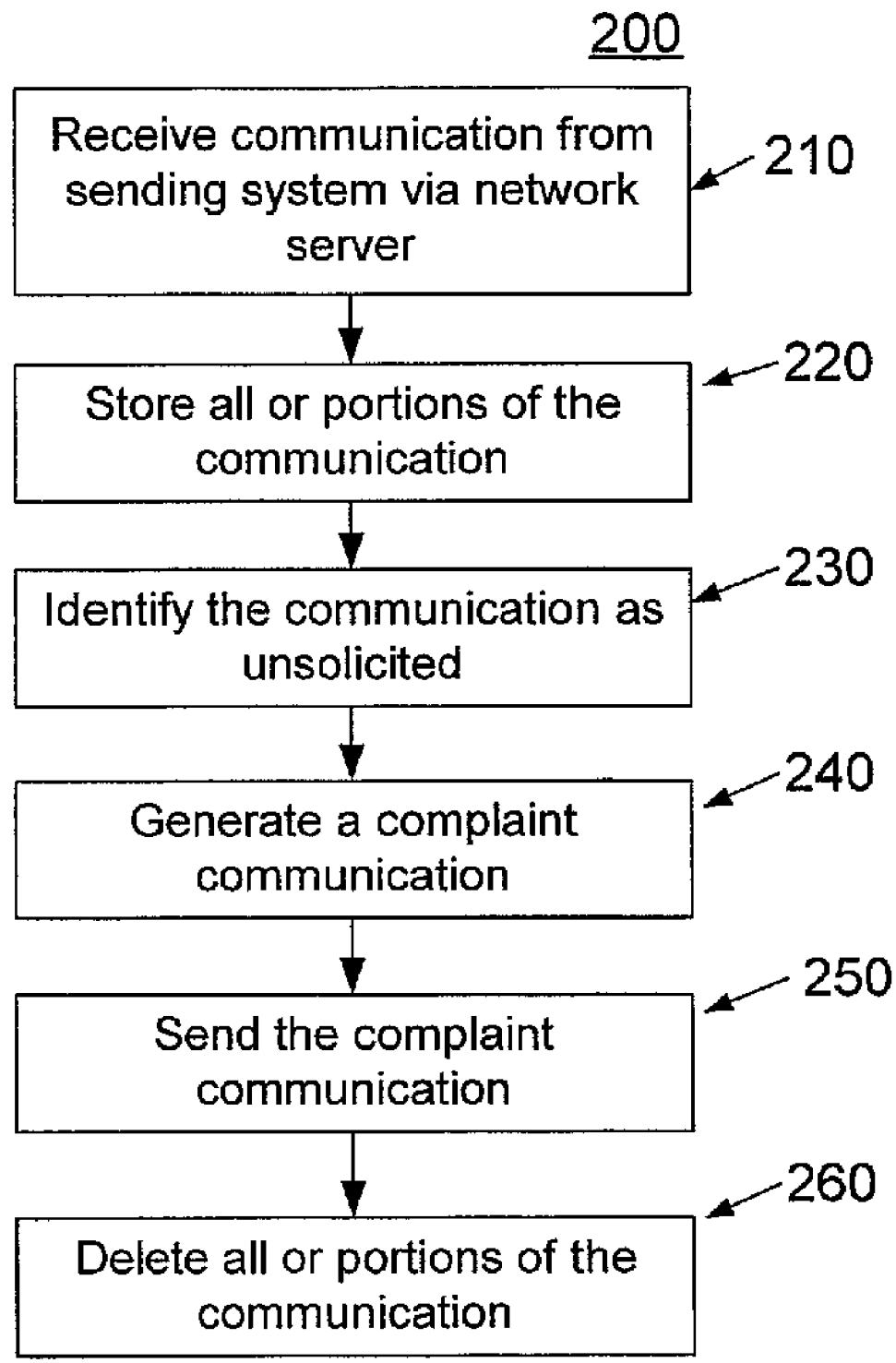
FIG. 2 is a flow chart illustrating an exemplary process for identifying unsolicited communications by generating a complaint communication.

Referring to FIG. 2, a process 200 may be used by the receiving system 140 to identify unsolicited communications by generating a complaint communication. Process 200 includes having the receiving system 140 receive a communication from the sending system 110 through the network server 130 (210). The communication is a digital file and may be received by the file relay 142a of the intermediate system 142 and optionally segmented into portions by the file segmentor 142b of the intermediate system 142. Portions or all of the communication are stored in the data store 144a of the access system 144 (220).

The received communication is identified as an unsolicited communication by, for example, examining the contents of the communication and indicating to the access system 144 that the communication is unsolicited (230). If a user interacts with the receiving system 140, the user may provide this information to the access system 144 by using the user interface 144b (e.g., by selecting the digital file from a list of received files and tagging the file as unsolicited). The receiving system 140 then generates a complaint communication (240). The complaint communication may be a digital file that incorporates all or portions of the unsolicited communication and additionally may include contents related to the nature of the identified unsolicited communication. The unsolicited communication or portions thereof that are incorporated into the complaint communication are referred to as the cause of the complaint. The additional contents typically are generated by the entity accessing the communication after identifying the communication as unsolicited. If the entity is a user, the user may input all or part of the additional contents using the optional user interface 144b. The complaint communication is sent to the network server 130 (250), and both the unsolicited communication and the complaint communication are deleted from the receiving system 140 (260).

Figure 3:
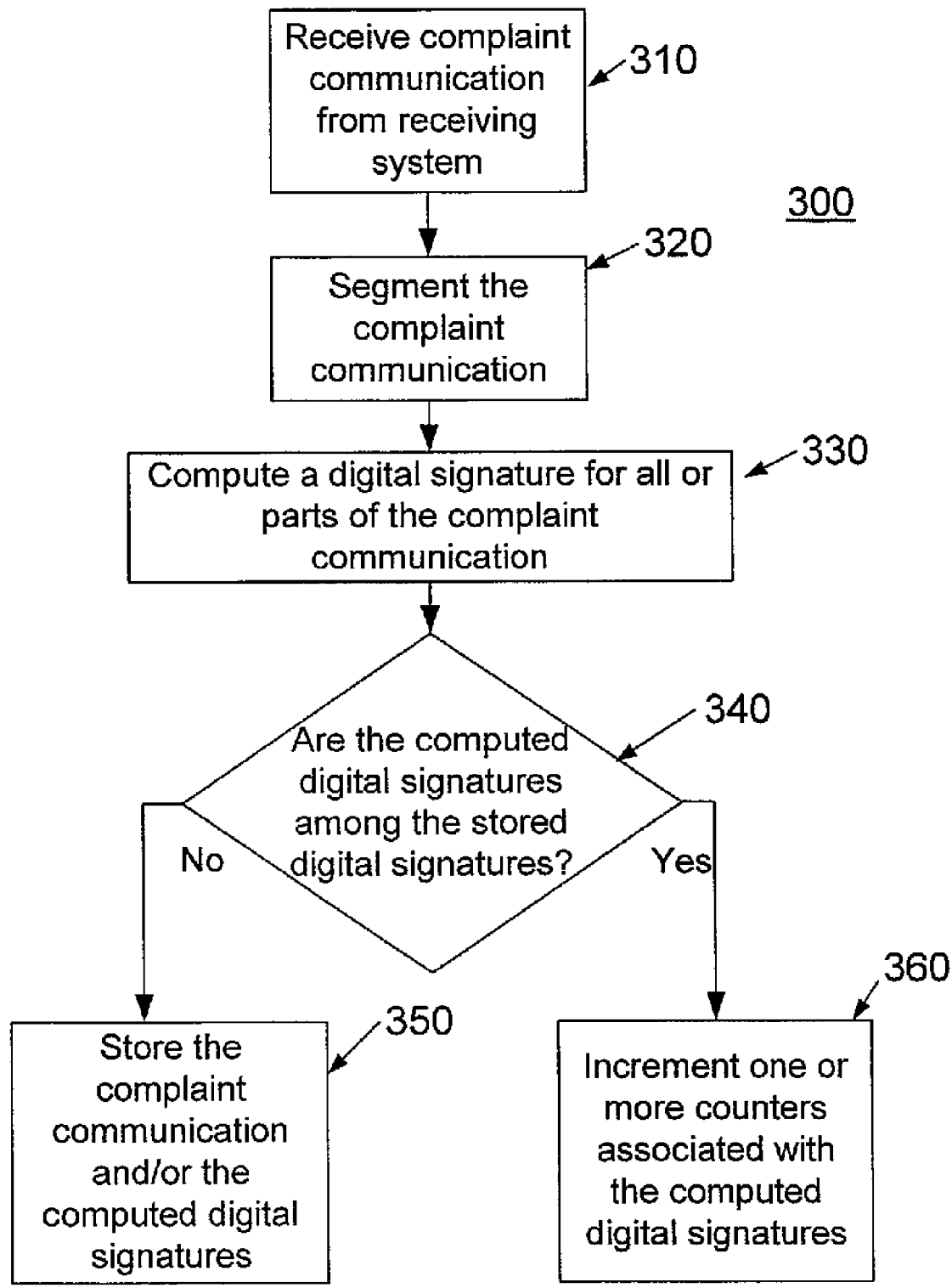
FIG. 3 is a flow chart illustrating an exemplary process for segmenting, storing, and keeping track of complaint communications.

Referring to FIG. 3, a process 300 may be used by the network server 130 for segmenting, storing, and tracking complaint communications. The process 300 includes having the network server 130 receive the complaint communication from the receiving system 140 (310). For instance, with reference to FIG. 1, the complaint communication may be received by the file relay 132a of the detection and filtration device 132 of the network server 130. The file segmentor 132b segments the received complaint communication (320). Typically, the file segmentor 132b segments the complaint communication into complaint portions (i.e., the additional contents) and cause portions (i.e., the unsolicited communication or portions thereof that caused the complaint communication).

A digital signature is computed by the detection and filtration device 132 for the received complaint communication or for any of the constituent parts identified by the file segmentor 132b (330). For example, the complaint communication may be separated into one or more constituent parts such that the digital signature of one or more of the constituent parts is determined.

The digital signature(s) generated from the complaint communication may be compared with other digital signatures stored in the data device 132c (340). In some implementations, comparing the digital signatures generated from the complaint communication(s) with the stored digital signatures involves a comparison of digital signatures for less than all aspects of the complaint communication (e.g., only comparing digital signatures of all or portions of the cause). In another implementation, the information that the file segmentor 132b extracts from the complaint communication may be compared with information accessible to the detection and filtration device 132 in addition to or in place of the use of a digital signature. For example, the actual portions of the complaint communication rather than the digital signatures of the portions may be compared. Alternatively, the digital signatures may be used to access and compare other information tied to the digital signatures through a database lookup.

If the computed digital signature(s) for the complaint communication are not among the stored digital signatures, the complaint communication and/or the computed digital signature(s) may be stored in the data device 132c (350), so as to enable future counting with respect to the underlying cause. If one or more of the computed digital signatures is among the information stored in the data device 132c, then one or more counters associated with the stored complaint communication information may be incremented (360). For example, if the detection and filtration device 132 receives complaint communications with identical or similar causes from different receiving systems 140, or from the same receiving system 140 but with different time stamps (i.e., portion of complaint header information is different), a counter may be incremented rather than redundantly saving the subsequent cause information or portions of the cause information. As noted above, such counters may be used to track the number of complaints received from recipient systems 140 associated with a given cause or a given cause sender.

The process 300 is described with respect to digital signatures. Nevertheless, the above concepts similarly are applicable to implementations involving comparison of the cause itself, or comparison of other identifiers.

Figure 4:
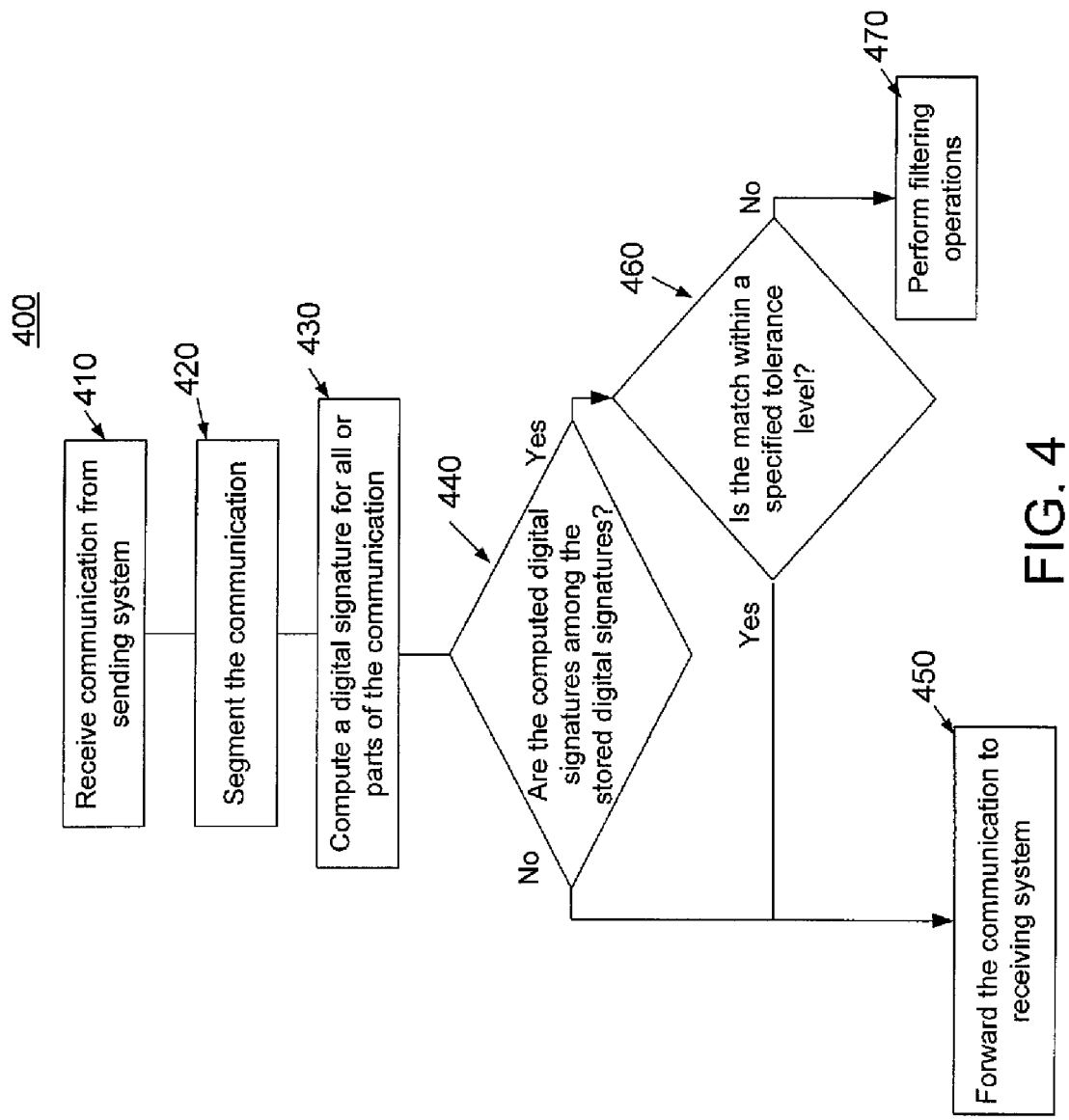
FIG. 4 is a flow chart illustrating an exemplary process for filtering unsolicited communications.

Referring to FIG. 4, a process 400 may be used by the network server 130 for filtering unsolicited communications sent by the sending system 110 to the receiving system 140 based on the values of the counters established/incremented in process 300. The process 400 includes having the network server 130 receive a communication from the sending system 110 (410). The communication is received by the file relay 132a and subsequently segmented into portions by the file segmentor 132b (420).

One or more digital signatures are computed by the detection and filtration device 132 for the received communication or for any of the constituent parts identified by the file segmentor 132b (430). The digital signatures generated from the communication are compared with other digital signatures stored in the data device 132c in a manner similar to that described previously for operation 340 of process 300 (440).

If the computed digital signatures are not among the stored digital signatures, then the communication is forwarded to the receiving system (450). If, however, the computed digital signatures are among the digital signatures stored in the data device 132c, then the values associated with the stored digital signatures are analyzed to see whether the values are within a specified tolerance level (460).

If the values are within the tolerance level, the communication is forwarded to the receiving system (450). If not, the file filter 132d performs one or more filtering operations (470). Typically, analysis of the values involves examining the counters associated with the stored digital signatures to see whether the counters indicate values above a certain threshold or tolerance level. The value indicated by each counter may correspond to the number of complaint votes that a corresponding communication portion has received from the receiving systems 140. Therefore, when the number of complaint votes received for a given communication portion surpasses a specified threshold, the file filter 132d performs the one or more filtering operations (470).

The filtering operations performed by the file filter 132d may include marking the IP address of the sender as suspect; blocking the digital file from being sent to its intended recipient; terminating or suspending the ISP account of the sender; refusing to allow further connections from the IP address of the sender; and holding the communication for further review. The file filter 132d may determine which action to perform based on the value of the counter or counters associated with the received communication or communication portion.

Figure 5:
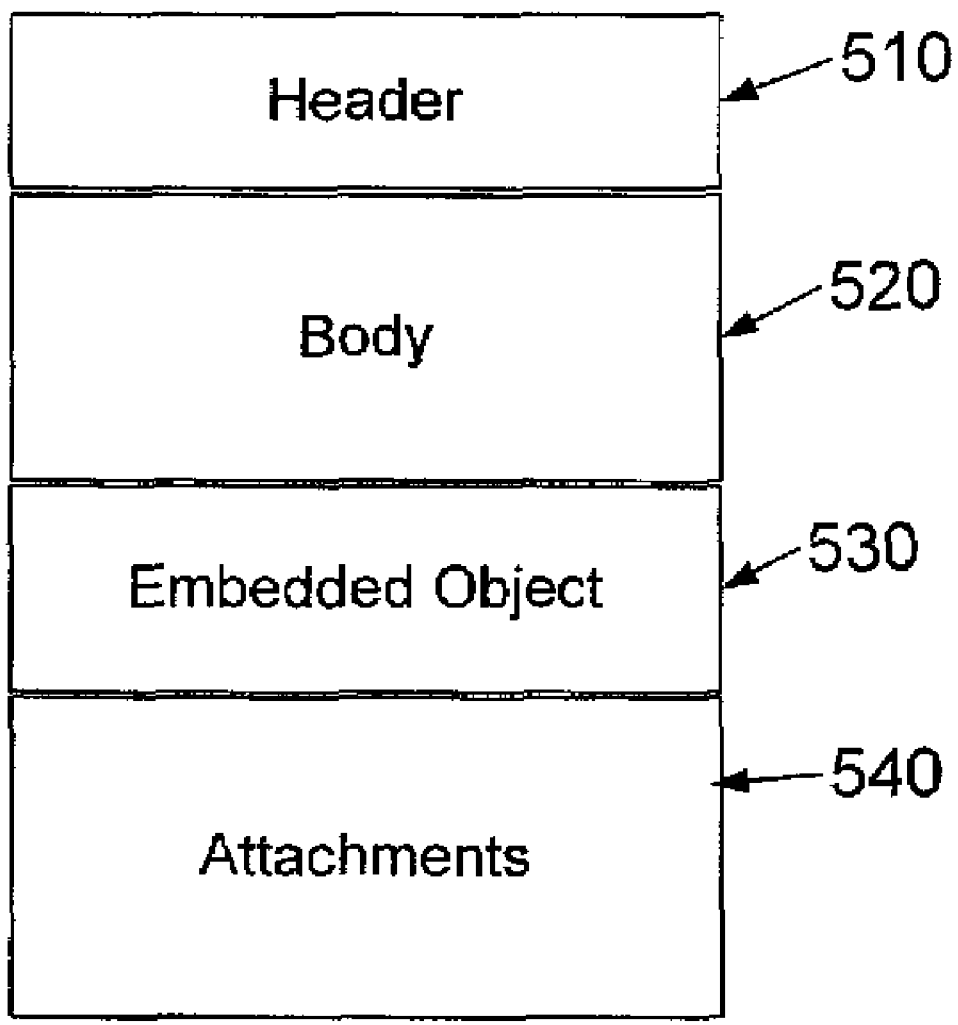
FIG. 5 is a block diagram illustrating an e-mail which may be included in, constitute, or contain a file exchanged in a network system, such as the network system illustrated by FIG. 1.

Referring to FIG. 5, an e-mail 500 may be the communication sent from the sending system 110 to the receiving system 140. The e-mail 500 may be an encoded text file that includes one or more of the following sections a header 510, a body 520, embedded object data 530, and attachments 540.

The e-mail header 510 typically includes a name or an address of the source or sender of the e-mail, a name or an address of the intended recipient or destination of the e-mail, a date and a time that the e-mail was sent, and a subject to which the e-mail relates. The e-mail header 510 also may include information relating to the path taken by the e-mail to arrive at its destination and the name of the e-mail application used to generate the e-mail.

The e-mail body 520 includes the contents or the message text of the e-mail and may include, for example, text provided by the user that generated the e-mail. The e-mail body 520 typically is stored directly as encoded text. The e-mail body 520 may include encoded text formatted according to the hypertext transfer markup language (HTML) that may be accessed and displayed using, for example, an HTML-compatible e-mail application.

The embedded object data 530 may include data, such as graphics data, that may be displayed as being included or incorporated seamlessly within the e-mail body 520 when a user accesses or opens the e-mail using the e-mail application. Typically, embedded objects are rendered immediately with the object or e-mail that incorporates them, without additional user interaction. The embedded object data 530 may be converted into encoded text (e.g., ASCII text) using an encoding scheme such as, for example, multipurpose Internet mail extensions (MIME) or Unix-to-Unix encode (Uuencode).

The embedded object data also or alternatively may include one or more files such as encoded text files, formatted text files (e.g., Microsoft Word documents), or binary files (e.g., graphics files). Formatted text files and binary files may be converted into encoded text using, for example, MIME or Uuencode.

The e-mail attachments 540 may have a form or content similar to the embedded object data 530 described above. The difference between the embedded object data 530 and the attachments 540 may be simply a matter of labeling or type identifier within the e-mail. From a user's perspective, an attachment, unlike embedded object data, typically is not rendered immediately with the e-mail, but rather requires additional user interaction prior to access or download (e.g., the user may click a hyperlink in the e-mail body 520 or header 510 to download an attachment).

Figure 6:
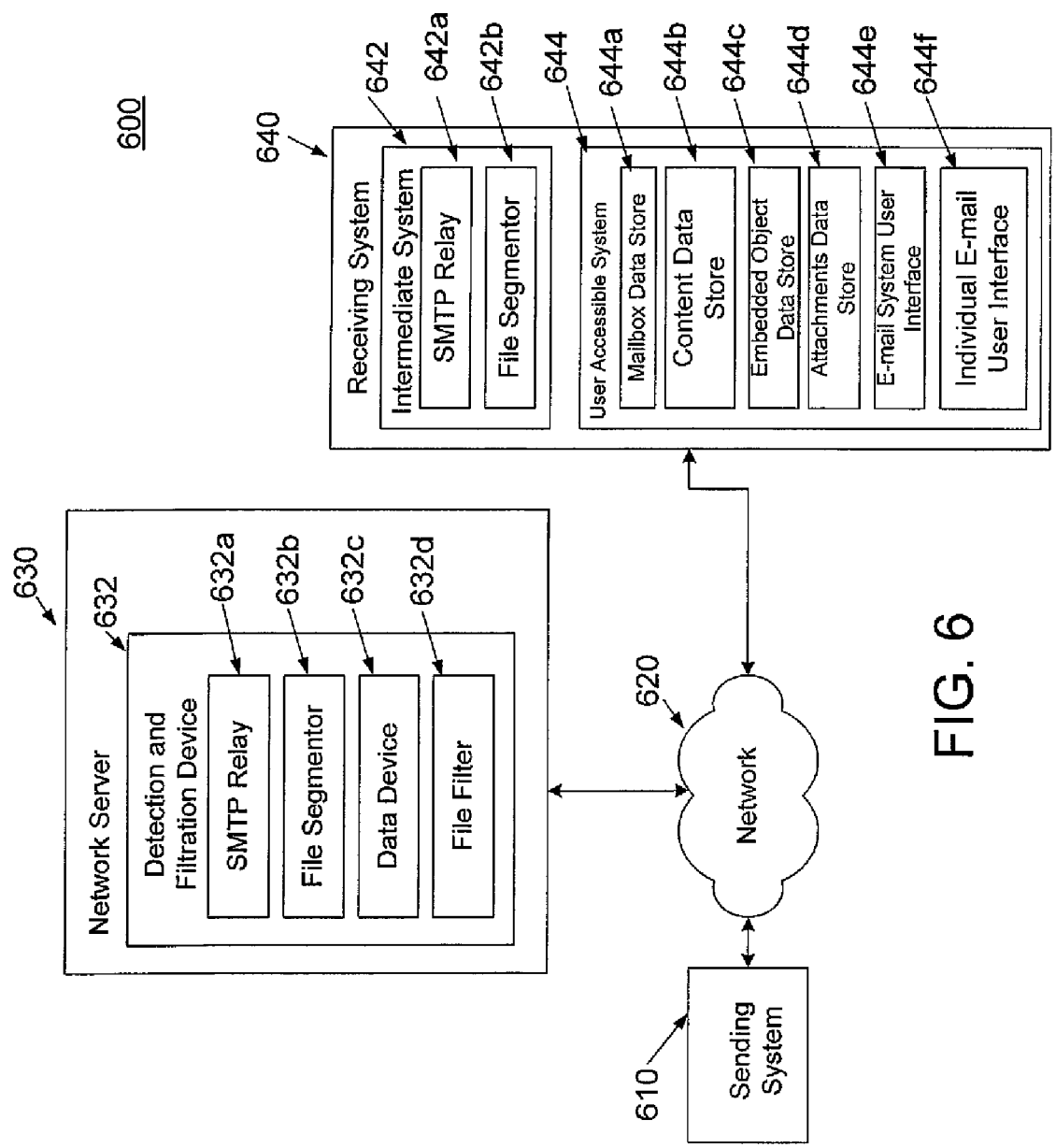
FIG. 6 is a block diagram illustrating an exemplary e-mail system capable of identifying and filtering unsolicited communications.

Referring to FIG. 6, an e-mail system 600 is capable of identifying and filtering unsolicited communications The system 600 includes a sending system 610 that sends e-mails to a receiving system 640 through a network 620 and a network server 630. Examples of each element within the communication system 600 of FIG. 6 are described broadly above with respect to FIG. 1. In particular, the sending system 610, the network 620, and the network server 630 typically have attributes comparable to those described with respect to the sending system 110, the network 120, and the network server 130 of FIG. 1, respectively. Likewise, the receiving system 640 of FIG. 6 typically has attributes comparable to and may illustrate one possible implementation of the receiving system 140 of FIG. 1.

The network server 630 includes a detection and filtration device 632 used to receive and filter e-mails addressed to the receiving system 640 from the sending system 610. The detection and filtration device 632 includes Simple Mail Transfer Protocol (SMTP) relays 632a able to communicate with the sending system 110 using a mail transfer protocol such as SMTP. The SMTP relays 632a communicate with one or more of the file segmentor 632b.

The file segmentor 632b may segment an e-mail into multiple sections based on the structure of the e-mail. As mentioned previously with respect to FIG. 5, the typical e-mail 500 may be composed of one or more of a: header 510, a body 520, embedded object data 530, and attachments 540. When the file segmentor 632b segment the e-mail based on the structure of the e-mail, the e-mail may be divided into sections corresponding to the e-mail header 510, the body 520, the embedded object data 530, attachments 540, and/or any combination thereof.

Additionally or alternatively, the file segmentor 632b may segment the information contained within any section of the e-mail 500. For example, the file segmentor 632b may segment the header 510 of the received e-mail 500. When segmenting the header 510, the file segmentor 632b may divide the header into portions including, but not limited to, the originating IP address, the time stamp, and many other identifying characteristics of the header information.

The file segmentor 632b also may segment the body 520 of an e-mail 500. When segmenting the body 520, the file segmentor 632b may separate particular or pre-designated portions of the body 520 of the received e-mail 500 from the rest of the received e-mail 500. As described with respect to FIG. 5, the body may take any of various forms, including a text message, a letter, or other information. For example, the body 520 may include a letter instructing the recipient that "the attached file is spam."

The file segmentor 632b also may segment the attachments 540 of the received e-mail 500. For example, the file segmentor 632b may access an attachment 540 and divide the attachment 540 into portions based on the content of the attachment 540.

The data device 632c receives the e-mail and/or e-mail portions from the file segmentor 632b and stores the e-mail and/or e-mail portions in a data storage or central repository. The file filter 632d performs filtering operations based on the e-mails received and the values stored in the counters of the data device 632c. The data device 632c and file filter 632d are e-mail-oriented implementations of the data device 132c and the file filter 132d of FIG. 1, respectively.

The receiving system 640 includes an intermediate system 642 and an access system 644. The intermediate system 642 receives e-mails from one or more sending systems 610 through the network server 630 and distributes the received e-mails to the access system 644. The intermediate system 642 includes one or more SMTP relays 642a and file segmentor 642b. The SMTP relays 642 and file segmentor 642b may be structured and arranged similarly to those located in the detection and filtration device 632.

The access system 644 enables a user to access e-mails or e-mail portions that have been sent to or that otherwise are made accessible to the receiving system 640. The access system 640 includes a storage device 644a for electronic mailbox information (e.g., header 510 information), a storage device 644b for e-mail body data, a storage device 644c for embedded object data, and a storage device 644d for e-mail attachments. In some implementations, one or more of the storage devices 644a-644b may be combined into a single storage device. In addition, the access system includes an e-mail system user interface 644e that may be used to select an individual e-mail and display a corresponding individual e-mail interface 644f. The interfaces 644e and 644f may be implemented as a client software module on the access system 644 or as a server software module in the intermediate system 642 or the network server 630 and perceivable using a browser interface. In some implementations, interfaces 644e and 644f may be combined into a single interface that enables control of both system-level e-mail operations and individual e-mail operations.

Figure 7:
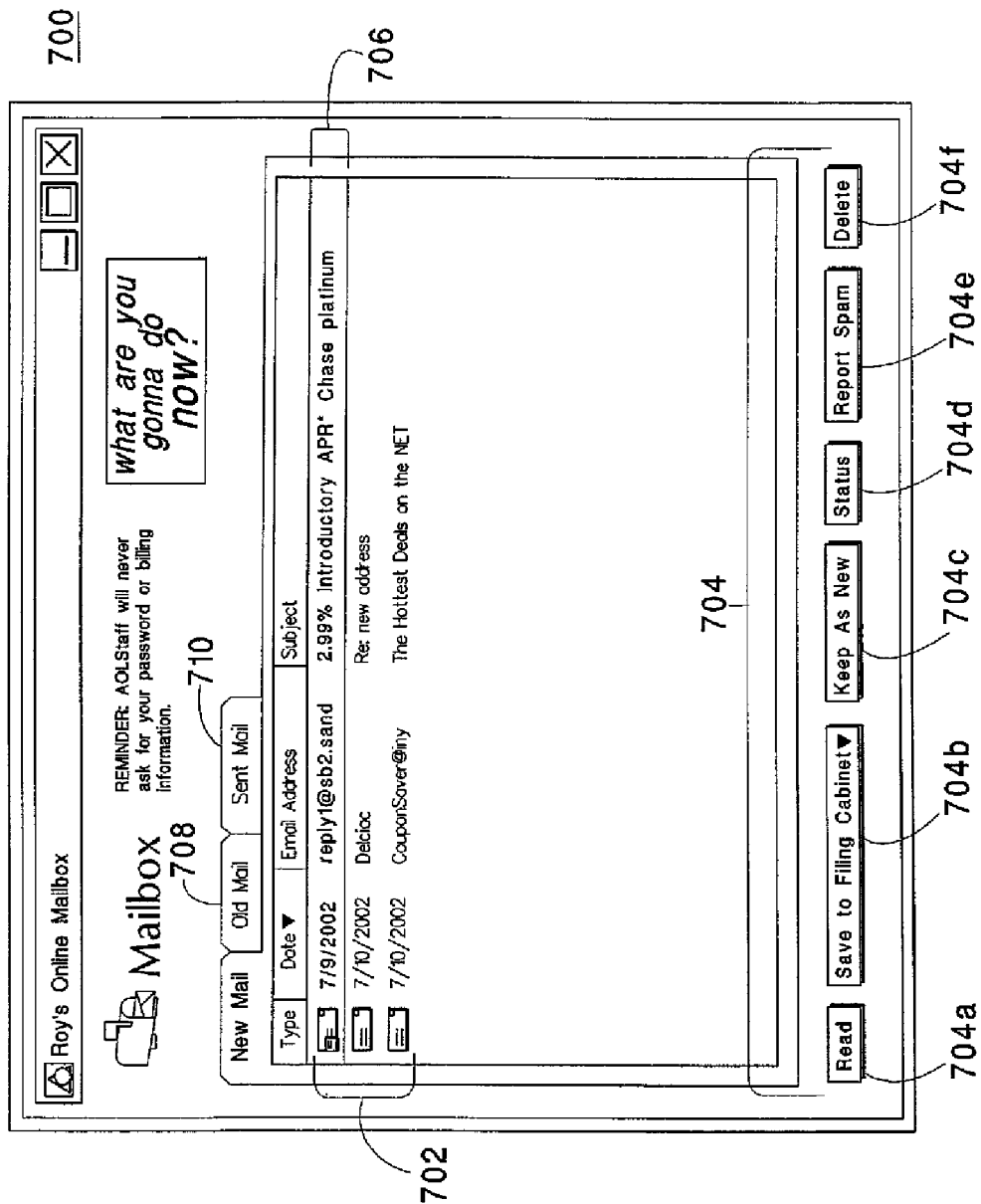
FIGS. 7 and 8 are exemplary user interfaces.

Referring to FIG. 7, an exemplary e-mail system user interface 700 includes a list 702 of selected portions of the header 510 of e-mails recently received (i.e., new mail) and e-mail operation buttons 704. A user may select an exemplary e-mail entry 706 in the list 702 using input means available to the user such as, for example, a keyboard or a mouse. A selected e-mail entry may be denoted as being selected by, for example, being highlighted.

Once an e-mail entry has been selected, the user may perform e-mail operations including, but not limited to: (1) reading the selected e-mail, (2) placing the e-mail in a selected folder or filing cabinet, (3) keeping the e-mail as new, (4) checking the status of the e-mail, (5) notifying an online service provider that a particular e-mail is spam, and (6) deleting the selected e-mail. The user may perform these operations on the selected e-mail by, for example, selecting one or more graphical elements displayed in the user interface 700 such as, for example, the buttons 704a, 704b, 704c, 704d, 704e, and 704f, respectively. Alternatively, the user may use keyboard function keys, pop-up menus, and/or mouse button inputs to perform one or more of these operations. The desired operations may be implemented, for example, through the use of hyperlinks that grant access to specified directories embedded in the online service provider's network and/or through the triggering of macros or other pre-programmed algorithms.

The user interface 700 also may allow the user to access other lists similar to list 702 but containing e-mail entries that satisfy different criteria. For example, the user interface 700 may include an old mail tab 708 and a sent mail tab 710. The old mail tab 708 and the sent mail tab 710 may be selected by a user to access lists comparable to list 702 but containing entries corresponding to old mail (i.e., read mail) and/or sent mail (i.e., mail sent by the user), respectively. In other implementations, the old mail, the sent mail, and the other lists may be accessed through selection of other graphical elements (e.g., buttons) displayed in the user interface 700 and/or through the use of keyboard function keys, pop-up menus, and/or mouse button inputs.

Figure 8:
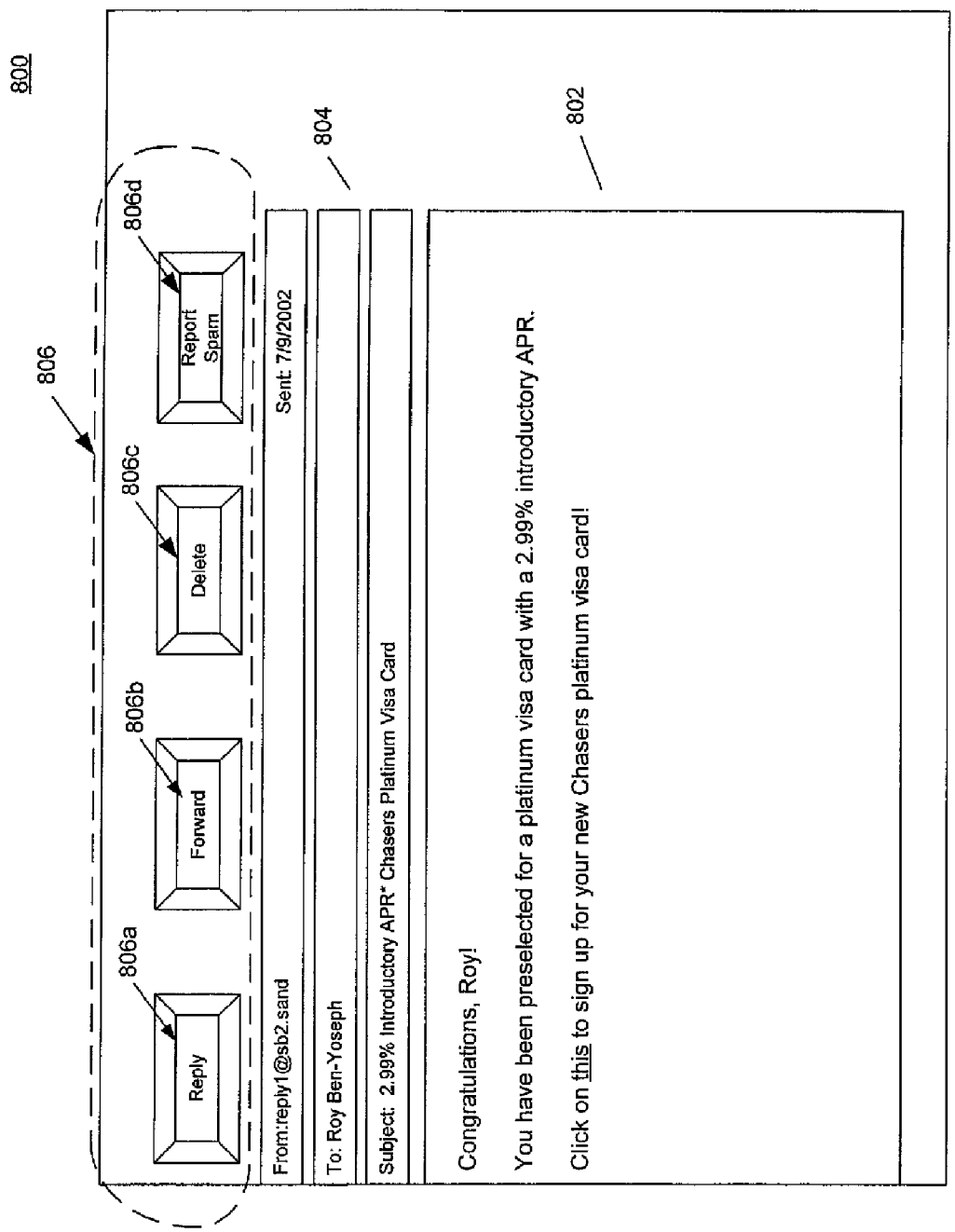

Referring to FIG. 8, when the user selects an e-mail entry corresponding to an e-mail from the list 702 and selects the read button 704a or performs a similar operation to view the e-mail, the individual e-mail interface 800 is presented to the user. The individual e-mail interface 800 may include a display 802 of the content of the e-mail, a display 804 of all or selected portions of the header of the e-mail, and one or more graphical elements or buttons 806 that allow the user to perform e-mail operations related to the selected e-mail.

For example, the individual e-mail interface 800 may include buttons 806 that may be selected to perform the following operations: (1) reply to the sender of the e-mail 806a, (2) forward the e-mail 806b, (3) delete the e-mail 806c, and (4) notify the online service provider that a particular e-mail is spam 806d. The desired operations may be implemented, for example, through the use of hyperlinks that grant access to specified directories embedded in the online service provider's network and/or through the triggering of macros or other pre-programmed algorithms.

Figure 9:
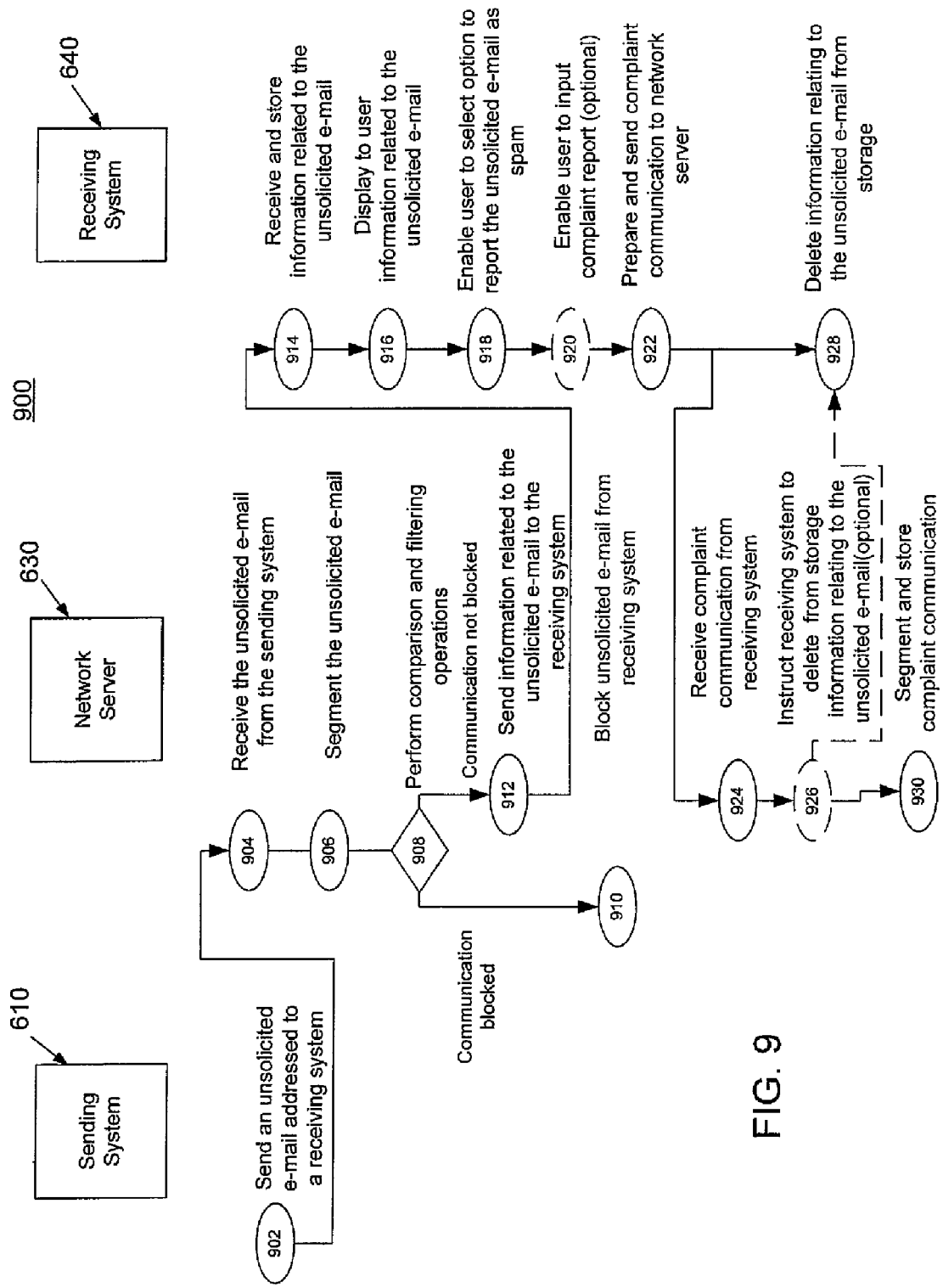
FIG. 9 is a flow chart illustrating an exemplary process for detecting unsolicited e-mails.

FIG. 9 illustrates a process 900 for detecting undesirable unsolicited e-mails (i.e., spam). For convenience, the process shown in FIG. 9 references particular elements described with respect to FIG. 6. However, similar methodologies may be applied in other implementations where different elements are used to define the structure of the system, or where the functionality is distributed differently among the elements shown by FIG. 6.

The sending system 610 sends an unsolicited e-mail, or cause, addressed to the receiving system 640 (902). The unsolicited e-mail may be, for example, an e-mail advertisement regarding the spring sale of company x, where the body 520 of the e-mail contains the advertisement.

The network server 630 receives the unsolicited e-mail from the sending system 610 (904), segments the e-mail (906), and performs comparison and filtering operations based on the unsolicited e-mail or a portion of the unsolicited e-mail (908). The network server 630 receives the e-mail advertisement, and the file segmentor 632b segment the e-mail, for example, based on the structure of the e-mail. A digital signature is computed for the e-mail body 520 and compared to the digital signatures of other e-mail bodies (i.e., cause bodies) stored in the data device 632c of the network server 630. If a match is found, the counter associated with the digital signature of the e-mail body is accessed. In this example, a digital signature matching the digital signature of the e-mail body 520 is found, and the counter associated with the digital signature indicates a value of 300 (i.e., three hundred users previously reported this e-mail body as spam). The file filter 632d of the network server may be programmed to perform a filtering operation if, for example, three hundred or more users have reported an e-mail or a portion of an e-mail (e.g., the body of an e-mail) as spam. For example, the file filter 632d may block any e-mail that has been reported as spam by three hundred or more users. The e-mail advertisement is, therefore, blocked since three hundred users have reported the body of the e-mail as spam.

Alternatively or additionally, the file filter 632d may perform other operations based on the value of the counter associated with the digital signature of the received e-mail body. For example, the IP address of the sender may be marked as suspect, the ISP account of the sender may be terminated (i.e., prevented from sending further e-mail), or the e-mail may be held for further review.

The file filter 632d also may perform operations based on one or more of the other sections or portions of sections of the received e-mail. For instance, the digital signature of the IP address of the sender portion of the e-mail header 510 also may be compared to stored digital signatures of sender IP addresses to determine the total number of complaints, if any, generated by all of the e-mails sent by that specific sender. If the total number of complaints is greater than a specified threshold, the file filter 632d may block the e-mail or perform one or more of the previously mentioned actions.

The filtering operations performed by the file filter 632d may be tiered. For example, the file filter 632d may mark the IP address of the sender as suspect if more than five hundred users have complained about e-mails received from that sender. If more than one thousand users have complained about e-mails received from that sender, the network server 630 may no longer allow any further e-mails from the specified IP address of the sender to reach any receiving system 640 or may optionally terminate the ISP account of the sender.

If the result of the filtering operations includes blocking the e-mail, the e-mail is blocked or otherwise made unavailable to the receiving system 640 (910). If the result of the filtering operations does not include blocking the e-mail, information related to the unsolicited e-mail is sent to the receiving system 640 (912). The information related to the unsolicited e-mail may be the unsolicited e-mail itself, a portion of the unsolicited e-mail, or alternatively or additionally may be information derived from the unsolicited e-mail.

The receiving system 640 receives and stores the information related to the unsolicited e-mail (914) and displays the information to the user (916). In one implementation, the information related to the unsolicited e-mail may be received by the intermediate system 642, which then relates all or a portion of the information to the user accessible system 644. All or a portion of the information then may be displayed to the user, for example, as an entry 706 in a list of received e-mails 702 in a user interface 700.

The receiving system 640 enables the user to select an option to report the unsolicited communication as spam (918). For example, the user may select or highlight the unsolicited communication entry 706 in list 702 by using an input mechanism. Once selected or highlighted, the user may select the "notify" or "report spam" button 704e in user interface 700 to report the unsolicited communication as spam. Alternatively, the user instead may select the read button 704d or perform a similar operation to view the communication. The user then is presented with the user interface 800 and may view the display 802 of selected portions of the header of the e-mail and the display 804 of the body or contents of the e-mail. The user then may report the unsolicited e-mail as spam by selecting, for example, the "notify" or "report spam" button 806d or a graphical element with similar functionality in the interface 800. The receiving system 640 optionally may enable the user to fill out a complaint report linked to the unsolicited e-mail or cause (920).

Figure 10:
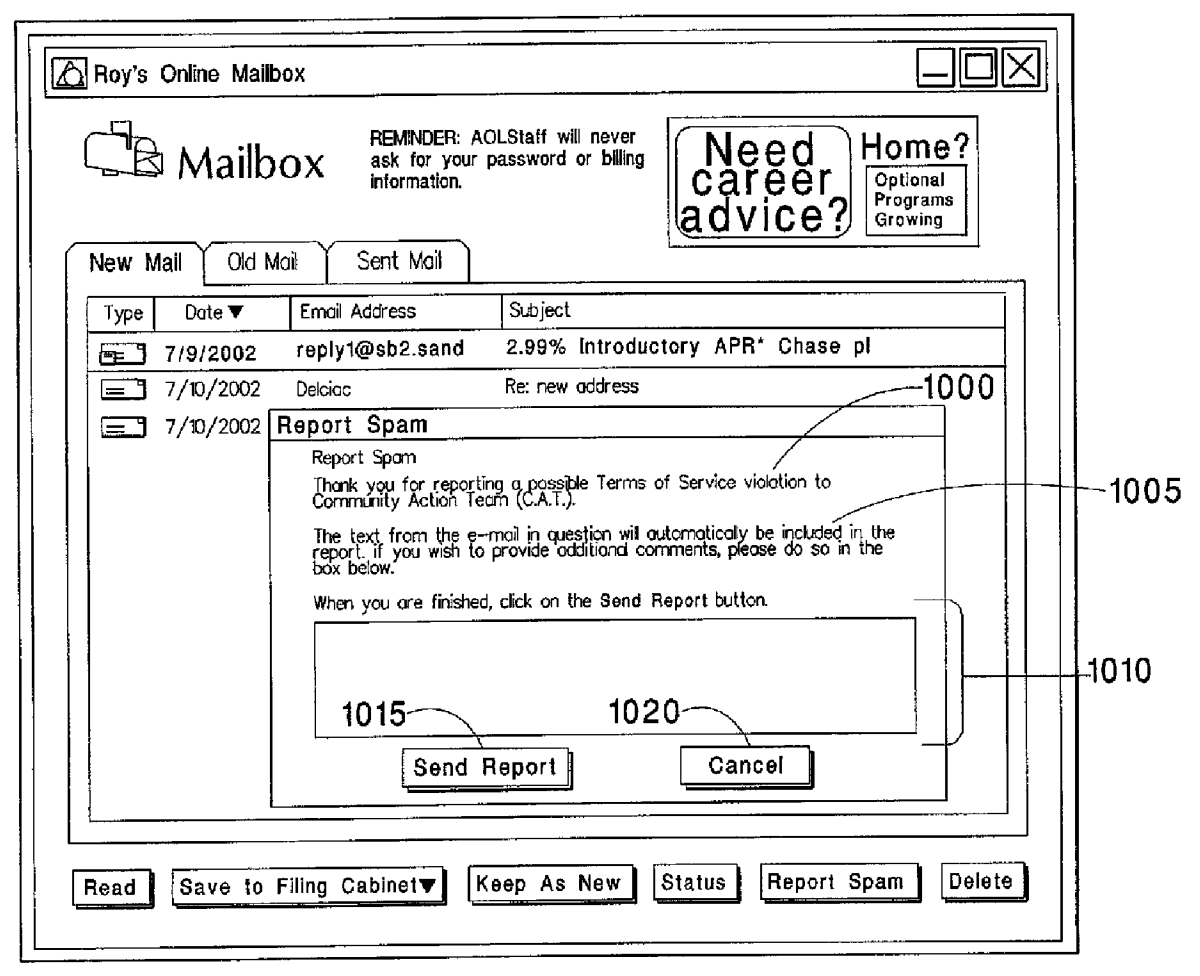

FIG. 10 shows an exemplary complaint report interface 1000 that may be presented to the user when the user selects the option to report the unsolicited e-mail as spam. The interface 1000 may include text 1005 that provides the user with, for example, instructions regarding how to fill out the report. The interface 1000 may include an input block 1010 in which the user may enter additional comments regarding, for example, the unsolicited e-mail and/or the sender of the unsolicited e-mail. In different implementations, user input of text into input block 1010 may be optional or required. The user may select a graphical element, such as, for example, a button 1015, to send the complaint report to the network server 630. Alternatively, the user may select a graphical element, such as, for example, a cancel button 1020, to decide against notifying the network server 630 that the unsolicited e-mail is spam. In another implementation, the interface 1000 may include a list of predetermined complaints/responses/categories and a user may select one or more of the predetermined complaints/responses/categories from the list.

The interface 1000 may "close" (i.e., disappear) upon selection of either the send report button 1015 or the cancel button 1020. Upon the interface 1000 closing, the user may, for example, be presented once again with the user interface 700 or 800. Also, after reporting the spam, the offending email may be deleted, and the corresponding communication entry 706 may be automatically deleted from the list 702 in FIG. 7, 700.

Referring, again to FIG. 9, the receiving system 640 prepares and sends a complaint communication to the network server 630 (922). The complaint communication may take many different forms. The following is a non-exhaustive list of several examples of complaint communications 1) the cause itself forwarded to the network server 630 by the receiving system 640; (2) a new e-mail including a body 520 containing the text of the complaint report and attachments 530 containing the cause or some portion of the cause; and/or (3) a new e-mail including a body 520 that contains text of the data of one or more sections of the cause (i.e., the header text, body text, embedded object text, and/or attachments text) and the text of the complaint report. In another implementation, the network server 630, rather than the receiving system 640, is provided with the complaint report information and prepares the complaint.

The network server 630 receives the complaint communication from the receiving system 640 (924) and optionally instructs the receiving system 640 to delete from storage information relating to the unsolicited e-mail (926). The receiving system 640 deletes from storage information relating to the unsolicited e-mail either upon sending the complaint communication or upon being instructed to do so by the network server 630 (928).

The network server 630 segments and stores the complaint communication (930). The network server 630 may, for example, segment the complaint communication into sections corresponding to one or more of the complaint header, the complaint body, the complaint embedded object, the complaint attachments, the cause header, the cause body, the cause embedded object, and the cause attachments, and may store these segments or update corresponding counters where appropriate according to a process such as that described with respect to FIG. 3 (i.e., operations 320-360).

Thus, the network server 630 stores the complaint communication in a manner that allows the network server 630 to keep track of the number of complaint communications generated from a specific cause or from a specific sending system 610. This tracking function allows the recipient systems 640 to effectively enter a "vote" for labeling a given cause as spam or a cause sender as a spam producer. When the number of complaint communications or "votes" for a given cause or cause sender reaches a predetermined threshold, the network server 630 may filter future communications from that sender or future communications that are similar to that cause as discussed previously with respect to operation 908.

A number of implementations have been described. Nevertheless, it will be understood that various modifications may be made. For example, the described systems, and processes may be applicable to the sending of generic communications, whether unsolicited or not, that comprise digital files that may be segmented and tallied in accordance with the techniques discussed.

The network server 130 or 630 may store only digital signatures and counters associated with those digital signatures rather than storing the actual digital files or portions of digital files themselves. In this implementation, only the access system 144 or 644 stores the actual digital files and/or digital file portions.

The network server 130 or 630 may be used to filter out troublesome sending systems 110 or 610 that are causing complaint communications of some nature to be generated from receiving systems 140 or 640. The communication abilities of the sending systems 110 or 610 to send communications to the receiving systems 140 or 640 may be controlled by the network server 130 or 630 depending, for example, on various rules set up specific to different complaint communication types and/or different specified sending systems 110 or 610.

Multiple buttons may be included in the user interface 144b (or 644e and/or 644f) to complain or categorize the communication in different ways. For example, the e-mails of a sender that harasses other users may be filtered (e.g., blocked) by the network server 130 or 630 if sufficient recipients of e-mails from that user complain about the e-mails of the user by selecting the e-mail and selecting, for example, a "report harassment" button.

In another implementation, an e-mail from a sender may be categorized by the recipient selecting the e-mail and selecting, for example, a "report x e-mail" button where "x" is a category of e-mail (e.g., where "x" is "pornogaphic"). In this example, the receiving system 140 or 640 generates and sends a categorization communication analogous to the complaint communication. If enough users report the e-mail or its sender as sending e-mails of "x"-type, similar e-mails (as determined by digital signature comparisons) or all of the e-mails from that sender may be treated differently. For example, if an e-mail or an e-mail sender is categorized as "pornographic," the network server may not send similar e-mails or e-mails from that sender to those receiving systems 140 or 640 that have chosen to not receive pornographic communications. The network server 130 or 630 may, for example, access a lookup table to determine which receiving systems do or do not want to receive pornographic communications. In another example, the "pornographic" e-mail may be placed in a "junk" or "porno" folder in the mailboxes of the users who have selected to receive this type of e-mail.

The categorization communication is treated in the same or in a similar manner as the complaint communication and may include a categorization header, a categorization body, a categorization embedded object, a categorization attachment, a cause header, a cause body, a cause embedded object, and a cause attachment. An analogous implementation may include having an entity such as a computer, rather than a user, provide the same complaint or categorization information to the network server 130 or 630. While these disclosed implementations are e-mail-oriented, they also may apply to any digital communications that are sent as digital files.

Instead of including multiple buttons, the user interface 144b (644e and/or 644f) may enable a user to complain and/or categorize a communication in a variety of different ways by including a pop-up menu, a window, or another input mechanism able to offer multiple complaint and/or categorization options.

In another implementation, the network server 130 or 630 may keep track of the number of complaint/categorization communications that a given user or entity submits by keeping track of the IP address portion of the header 510 of the complaint/categorization communication. Users may be encouraged to submit complaint/categorization communications by providing incentives to users that submit a large number of complaint/categorization communications.

Users may opt into application of filtering based on the complaint/categorization communications of other users. Some users may prefer to have communications addressed to them filtered out and/or categorized by the necessarily inexact recipient "voting" described above. Others will prefer to receive 100% of the communications addressed to them without categorization, allowing them to completely control all e-mail filtering and categorization.

In another implementation, a user or entity may change the categorization of a given communication by submitting a categorization communication to the network server that points out the incorrect categorization. For example, a user may receive an e-mail from a friend that is incorrectly categorized as spam. The user may notify the network server 130 or 630 through a categorization communication that the e-mail is not spam. The network server 130 may then recategorize communications from that sender for that specific recipient and/or for other recipients.

The described concepts also may be applied to a telephone network in place of the computer/e-mail network described above. Specifically, the digital files (i.e., communications) mentioned above may be considered digital or analog files transmitted over a telephone network. These files commonly contain voice data along with routing, re-routing and/or identification information (e.g., ANI information) similar to the header 510 of FIG. 5. This information may be removed, separated, or identified from the file transmitted over the network by a comparable file segmentor 132b or 632b, and the information may be stored in a centralized database with search and/or comparison and/or other manipulation abilities similar to those of the data device 132c or 632c. In addition, a voice-driven interface may be provided that may for example enable a button, such as #, *, or any of the buttons on a standard telephone to be used in place of the Notify button 304 or 404.

Accordingly, these and other implementations are within the scope of the following claims.

What is claimed is:

1. A method for classifying digital communications, the method comprising:

enabling a recipient to perceive information relating to one or more digital communications received by the recipient;

enabling a first interface element that enables the recipient to issue a complaint about one or more digital communications received by the recipient;

receiving user input selecting a digital communication and invoking the first interface element while the digital communication is selected;

in response to the user input invoking the first interface element while the digital communication is selected, displaying a complaint report interface that enables the recipient to enter additional information regarding the complaint about the digital communication;

in response to receiving additional information regarding the complaint about the digital communication, generating, using a computer, a complaint report that combines information about of the digital communication with the additional information regarding the complaint about the digital communication; and notifying a network server of the complaint about the digital communication by sending the generated complaint report to the network server.

2. The method of claim 1 wherein the first interface element enables the recipient to classify the digital communications as unsolicited digital communications.

3. The method of claim 1 wherein the first interface element enables the recipient to classify the digital communications as spam.

4. The method of claim 1 wherein the digital communications comprise e-mails.

5. The method of claim 1 wherein the digital communications comprise instant messages.

6. The method of claim 1, further comprising enabling a second interface element structured and arranged to allow the recipient to indicate information pertaining to the digital communications upon selection of the first interface element.

7. The method of claim 1:
wherein displaying a complaint report interface that enables the recipient to enter additional information regarding the complaint about the digital communication comprises displaying an input block that enables the recipient to enter text comments regarding the complaint about the digital communication; and
wherein generating a complaint report that combines information about of the digital communication with the additional information regarding the complaint about the digital communication comprises, in response to receiving text comments regarding the complaint about the digital communication, generating a complaint report that combines information about of the digital communication with the text comments regarding the complaint about the digital communication.

8. The method of claim 1:
wherein displaying a complaint report interface that enables the recipient to enter additional information regarding the complaint about the digital communication comprises displaying a list of predetermined complaints from which the recipient is able to select; and
wherein generating a complaint report that combines information about of the digital communication with the additional information regarding the complaint about the digital communication comprises, in response to receiving selection of a predetermined complaint, generating a complaint report that combines information about of the digital communication with an indication of the predetermined complaint selected.

9. The method of claim 1:
wherein displaying a complaint report interface that enables the recipient to enter additional information regarding the complaint about the digital communication comprises displaying a list of predetermined responses from which the recipient is able to select; and
wherein generating a complaint report that combines information about of the digital communication with the additional information regarding the complaint about the digital communication comprises, in response to receiving selection of a predetermined response, generating a complaint report that combines information about of the digital communication with an indication of the predetermined response selected.

10. The method of claim 1:
wherein displaying a complaint report interface that enables the recipient to enter additional information regarding the complaint about the digital communication comprises displaying a list of predetermined categories from which the recipient is able to select; and
wherein generating a complaint report that combines information about of the digital communication with the additional information regarding the complaint about the digital communication comprises, in response to receiving selection of a predetermined category, generating a complaint report that combines information about of the digital communication with an indication of the predetermined category selected.

11. The method of claim 1 wherein generating a complaint report that combines information about of the digital communication with the additional information regarding the complaint about the digital communication comprises generating a complaint report that combines text of the digital communication with the additional information regarding the complaint about the digital communication.

12. The method of claim 1 further comprising requiring the recipient to enter additional information regarding the complaint prior to notifying the network server of the complaint about the digital communication.

13. The method of claim 1 further comprising displaying multiple buttons configured to enable the recipient to complain about the digital communication in different ways.

14. The method of claim 1 further comprising displaying multiple buttons configured to enable the recipient to categorize the digital communication in at least three different ways.

15. The method of claim 1 wherein enabling a first interface element that enables the recipient to issue a complaint about one or more digital communications received by the recipient comprises enabling a first interface element that enables the recipient to report harassment.

16. The method of claim 1 wherein enabling a first interface element that enables the recipient to issue a complaint about one or more digital communications received by the recipient comprises enabling a first interface element that enables the recipient to report pornographic communications.

17. The method of claim 1:
wherein enabling a recipient to perceive information relating to one or more digital communications received by the recipient comprises enabling the recipient to perceive information relating to a categorization of a particular digital communication received by the recipient and sent by a particular sender, and
further comprising enabling the recipient to notify the network server that the categorization of the particular digital communication was incorrect, thereby causing the network server to recategorize communications sent by the particular sender to the recipient.

18. The method of claim 1 further comprising:
enabling the recipient to opt into application of filtering digital communications based on complaint communications of other users;
filtering digital communications addressed to the recipient based on complaint communications of other users when the recipient opts into application of filtering; and
handling all digital communications addressed to the recipient without filtering based on complaint communications of other users when the recipient opts out of application of filtering.

19. At least one computer-readable storage medium encoded with executable instructions that, when executed by at least one processor, cause the at least one processor to perform operations comprising:
- enabling a recipient to perceive information relating to one or more digital communications received by the recipient;
- enabling a first interface element that enables the recipient to issue a complaint about one or more digital communications received by the recipient;
- receiving user input selecting a digital communication and invoking the first interface element while the digital communication is selected;
- in response to the user input invoking the first interface element while the digital communication is selected, displaying a complaint report interface that enables the recipient to enter additional information regarding the complaint about the digital communication;
- in response to receiving additional information regarding the complaint about the digital communication, generating, using a computer, a complaint report that combines information about of the digital communication with the additional information regarding the complaint about the digital communication; and
- notifying a network server of the complaint about the digital communication by sending the generated complaint report to the network server.

20. At least one electronic device including at least one computer-readable storage medium storing instructions that, when executed by a processor, cause operations comprising:
- enabling a recipient to perceive information relating to one or more digital communications received by the recipient;
- enabling a first interface element that enables the recipient to issue a complaint about one or more digital communications received by the recipient;
- receiving user input selecting a digital communication and invoking the first interface element while the digital communication is selected;
- in response to the user input invoking the first interface element while the digital communication is selected, displaying a complaint report interface that enables the recipient to enter additional information regarding the complaint about the digital communication;
- in response to receiving additional information regarding the complaint about the digital communication, generating, using a computer, a complaint report that combines information about of the digital communication with the additional information regarding the complaint about the digital communication; and
- notifying a network server of the complaint about the digital communication by sending the generated complaint report to the network server.

\* \* \* \* \*